(12) United States Patent
Vilaipornsawai et al.

(10) Patent No.: US 9,379,917 B2
(45) Date of Patent: Jun. 28, 2016

(54) SYSTEM AND METHOD FOR CHANNEL ESTIMATION FOR GENERALIZED FREQUENCY DIVISION MULTIPLEXING (GFDM)

(71) Applicant: Huawei Technologies Co., Ltd., Shenzhen (CN)

(72) Inventors: Usa Vilaipornsawai, Nepean (CA); Ming Jia, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/021,840

(22) Filed: Sep. 9, 2013

(65) Prior Publication Data

US 2015/0071242 A1   Mar. 12, 2015

(51) Int. Cl.
*H04L 27/28* (2006.01)
*H04L 25/02* (2006.01)
*H04L 25/03* (2006.01)
*H04L 5/00* (2006.01)

(52) U.S. Cl.
CPC ........ *H04L 25/0224* (2013.01); *H04L 25/0204* (2013.01); *H04L 25/03006* (2013.01); *H04L 25/03114* (2013.01); *H04L 25/03343* (2013.01); *H04L 5/0048* (2013.01)

(58) Field of Classification Search
CPC .............. H04L 25/0224; H04L 5/0048; H04L 25/03006
USPC .................................................. 375/260, 259
See application file for complete search history.

(56) References Cited

U.S. PATENT DOCUMENTS

| | | | |
|---|---|---|---|
| 2009/0323515 A1* | 12/2009 | Ishikura et al. ................ | 370/210 |
| 2010/0080323 A1* | 4/2010 | Mueck et al. ................. | 375/296 |
| 2010/0124297 A1* | 5/2010 | Papasakellariou et al. ... | 375/260 |
| 2011/0058599 A1 | 3/2011 | Gaur | |
| 2013/0163542 A1 | 6/2013 | Fettweis et al. | |

FOREIGN PATENT DOCUMENTS

CN          103248455 A          8/2013

OTHER PUBLICATIONS

Javaudin, J., et al., "Pilot-Aided Channel Estimation for OFDM/OQAM," The 57th IEEE Semiannual Vehicular Technology Conference, vol. 3, Apr. 22-25, 2003, pp. 1581-1585.

(Continued)

*Primary Examiner* — Qutbuddin Ghulamali
(74) *Attorney, Agent, or Firm* — Slater Matsil, LLP (57) ABSTRACT

Embodiments are provided for pre-cancelling signal interference in Generalized Frequency Division Multiplexing (GFDM). Signal interference is pre-cancelled, at a transmitter, so that clean pilots are observed at a receiver and hence used for channel estimation. Using a Pilot-Interference Cancellation (Pilot-IC) method, interference is pre-cancelled at only pilot symbols. Alternatively, interference is simultaneously pre-cancelled at all symbols using a Transmitter IC (Tx-IC) method. The embodiments also include scattering the pilots over frequency and time resources to estimate channels which are frequency selective and time-variant. The channel estimates at the receiver are then used for single-tap channel equalization at time-frequency grid data points, where no assumption of time-invariant channels is required.

17 Claims, 5 Drawing Sheets

(56) References Cited

OTHER PUBLICATIONS

Fettweis, G., "GFDM—Generalized Frequency Division Multiplexing," IEEE 69th Vehicular Technology Conference, Apr. 26-29, 2009. pp. 1-4.

Michailow, N., "Integration of a GFDM Secondary System in an OFDM Primary System," Future Network & Mobile Summit, Jun. 15-17, 2011, pp. 1-8.

International Search Report and Written Opinion received in International Application No. PCT/CN2014/085797 mailed Nov. 15, 2014, 11 pages.

* cited by examiner

SYSTEM AND METHOD FOR CHANNEL ESTIMATION FOR GENERALIZED FREQUENCY DIVISION MULTIPLEXING (GFDM)

TECHNICAL FIELD

The present invention relates to the field of wireless communications, and, in particular embodiments, to a system and method for channel estimation for generalized frequency division multiplexing (GFDM).

BACKGROUND

OFDM is used in broadband multicarrier communications. However, OFDM suffers from high out-of-band (OOB) radiation, due to the use of square pulses (e.g., a sinc function in frequency domain). Due to the high OOB, OFDM may have disadvantages in some scenarios, such as for opportunistic radio communications. Generalized Frequency Division Multiplexing (GFDM) is a Filtered Bank Multicarrier (FBM) scheme for telecommunications, which applies a spectral-contained pulse shaping over each subcarrier to reduce OOB radiation. Due to pulse shaping, subcarriers in GFDM are no longer orthogonal and there is an intrinsic interference in the signal. Channel equalization based on Discrete Fourier Transform (DFT)/inverse DFT (IDFT) can be used over GFDM symbols, which are normally longer than OFDM symbols. This causes long delays in symbol transmissions. Further, using the DFT/IDFT assumes the channel to be time-invariant. This assumption may not be accurate which affects accuracy in channel equalization and hence affects quality of communications. Further, there is no current method for channel estimation in GFDM. Thus, there is a need for a channel estimation and improved equalization for GFDM.

SUMMARY OF THE INVENTION

In accordance with an embodiment of the disclosure, a method implemented by a transmitter component for enabling channel estimation for Generalized Frequency Division Multiplexing (GFDM) signals in a network includes allocating pilot symbols over both frequency and time resources and calculating interference from data at the pilot symbols. The method further includes pre-cancelling the interference for the pilot symbols and transmitting the pilot symbols and data symbols over the frequency and time resources.

In accordance with another embodiment of the disclosure, a transmitter component configured to enable channel estimation for GFDM signals in a network includes at least one processor and a computer readable storage medium storing programming for execution by the at least one processor. The programming includes instructions to allocate pilot symbols over both frequency and time resources and calculate interference of data at the pilot symbols. The transmitter component is further configured to pre-cancel the interference for the pilot symbols. The pilot symbols and data symbols for the channels are then transmitted over the frequency and time resources.

In accordance with another embodiment of the disclosure, a method implemented by a receiver component for channel estimation for GFDM signals in a network includes receiving pilot symbols and data symbols of GFDM signals. The pilot symbols are allocated at both frequency and time resources. Further, the interference for the pilot symbols is pre-cancelled at a transmitter. The method further includes estimating the channels associated with the pilot symbols.

In accordance with yet another embodiment of the disclosure, a receiver component configured for channel estimation for GFDM signals in a network includes at least one processor and a computer readable storage medium storing programming for execution by the at least one processor. The programming includes instructions to receive pilot symbols and data symbols of GFDM signals, wherein the pilot symbols are allocated at both frequency and time resources. The interference for the pilot symbols is pre-cancelled at a transmitter. The receiver component is further configured to estimate the channels associated with the pilot symbols.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In GFDM, a time-frequency grid of data is filtered and modulated, e.g., filtered in time direction and then modulated to each subcarrier frequency. However, due to the pulse shaping, subcarriers in GFDM are no longer orthogonal and there exists self-induced interferences. Typically, this issue is addressed by designing a receiver that can cancel such interferences. Further to handle the case of multipath fading channels, channel equalization based on DFT/IDFT over a GFDM symbol is used under time-invariant channel assumption, assuming channel knowledge. However, there is no effective channel estimation scheme available for GFDM, and there is no solution for channel equalization for time-varying fading within the GFDM symbol.

Embodiments are provided for implementing channel estimation for Generalized Frequency Division Multiplexing (GFDM). The embodiments include pre-cancelling, at a transmitter, complex-valued interference inherent in GFDM (due to pulse shaping), so that clean pilots can be observed at the receiver and used for channel estimation. A single-tap channel equalization is also used at time-frequency grid data points, where no assumption of time-invariant channels is required. Two alternative methods are provided for channel estimation. In a first method, referred to herein as Pilot-Interference Cancellation (Pilot-IC), interference is pre-cancelled at only pilot symbols. In a second method, referred to herein as Transmitter IC (Tx-IC), interference is simultaneously pre-cancelled at all symbols, then only known pilot symbols can be used for channel estimation at the receiver. The embodiments also include scattering the pilots over frequency and time resources to estimate channels which are frequency selective and time-variant. The channel estimates are then used for single-tap channel equalization at time-frequency grid data points, where no assumption of time-invariant channels is required.

The GFDM channel estimation schemes are relatively simple to implement and are bandwidth efficient since only pilot symbols (rather than all data symbols) are used for channel estimation. The schemes also provide high channel estimation quality via pre-interference cancellation at the transmitter, which allows the receiver to observe and use clean pilot symbols in channel estimation. Further, the Pilot-IC method provides low complexity at the transmitter, while the Tx-IC provides low complexity at the receiver. For instance, to reduce complexity and hence cost of a user device or equipment (UE), the Pilot-IC method can be used on uplink from a transmitter of the UE to a zero forcing (ZF) receiver in a network. As such, the transmitter at a communication device has less complexity as only interference is cancelled at only pilot symbols, and the burden of interference cancellation on data symbols can be pushed to the base station or network component. To reduce complexity and hence cost of a UE, the TX-IC method can be used on downlink from a transmitter in a network to the a matched filter (MF) receiver of the UE. Since in Tx-IC both data and pilot symbols are interference pre-cancelled at the transmitter, a simpler or less complex receiver (e.g., a MF receiver) can be used. Hence, the high computation burden is pushed to the base station or network side. Additionally, the schemes allow estimation of channels that are both frequency selective and time variant, using scattered pilots over frequency and time grid. Low latency can also be achieved using matched filtering for channel estimation and demodulation/filtering.

Figure 1:
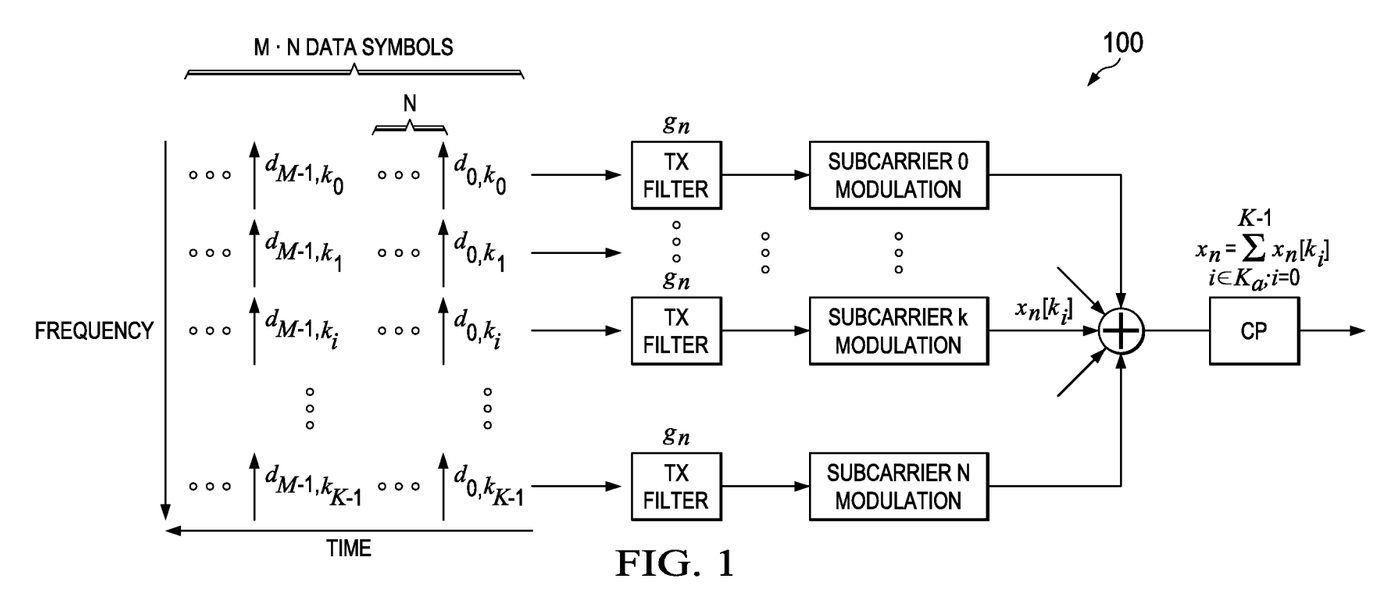
FIG. 1 illustrates a GFDM transmitter architecture.

FIG. 1 shows an example of a GFDM transmitter architecture 100, where a block of M×K complex valued data, D is considered. Such data is spread across K active subcarriers (in the set $K_a=\{k_0, k_1, \ldots, k_{K-1}\}$) and M time slots. This can be represented as:

$$D = \begin{bmatrix} d_{0,k_0} & d_{0,k_1} & \cdots & d_{0,k_{K-1}} \\ d_{0,k_0} & d_{0,k_1} & \cdots & d_{1,k_{K-1}} \\ \vdots & \vdots & \ddots & \vdots \\ d_{M-1,k_0} & d_{M-1,k_1} & \cdots & d_{M-1,k_{K-1}} \end{bmatrix}.$$

For each subcarrier $k \in K_a$, the M data on such subcarrier is first upsampled by factor N. This operation is done by performing the summation $\Sigma_{m=0}^{M-1} d_{m,k} \delta[n-mN]$. The resulting signal is then convolved with a pulse shaping filter $g_n$ and shifted by a factor $$\frac{k_i}{N}$$

in frequency, where $$\frac{1}{N}$$

is subcarrier spacing. A circular convolution can be used in the filtering process to prevent a time expansion. The transmitted signal, e.g., the summation of all subcarrier signals, is given by:

$$x_n = \sum_{k \in K_a} \left[ \left( \sum_{m=0}^{M-1} d_{m,k} \delta[n-mN] \right) * g_n \right] e^{j2\pi \frac{kn}{N}}$$

$$= \sum_{k \in K_a} \sum_{m=0}^{M-1} d_{m,k} g_n[m, k]$$

$$= \sum_{k \in K_a} x_n[k],$$

where * denotes the convolution operator, and $$g_n[m, k] = (\delta[n-mN] * g_n) e^{j2\pi \frac{kn}{N}}$$

is the shifted version of $g_n$ in time and frequency. The transmitted signal $x_n$ can be efficiently implemented using DFT/IDFT pairs. A cyclic prefix (CP) is then added to $x_n$ before transmission. Similar to OFDM, the CP is used as guard time, preventing inter-symbol interference (ISI), and allowing the use of DFT/IDFT for channel equalization at the transmitter.

The GFDM system can also be expressed in a matrix model, such as:

$$x=Ad,$$

where d=vec(D) is the data vector and A with a row $A_{n,:} = [W_{k,n}^H]_{n,:} \otimes [G']_{n,:}$ is the system matrix, with $$W_{k,n} = \left\{ e^{\frac{-j2\pi kn}{N}} \right\},$$

$k \in K_a$, n=0, ... NM−1 being the subcarrier modulation matrix, and $G'=G \times S_N^M$ being the modified filtering matrix. The filtering matrix G is represented as follow:

$$G = \begin{bmatrix} g_0 & g_{NM-1} & \cdots & g_1 \\ g_1 & g_0 & & g_2 \\ \vdots & \vdots & \ddots & \vdots \\ g_{NM-1} & g_{NM-2} & \cdots & g_0 \end{bmatrix},$$

and the up-sampling matrix is $$S_N^M = \{s_{n,m}\},$$

$$s_{n,m} = \begin{cases} 1, & n = (m-1)N + 1 \\ 0, & \text{else} \end{cases}$$

Table 1 below presents a list of notations used herein.

TABLE 1

List of Notations.

| Notations | Description |
|---|---|
| $\otimes$ | Kronecker product |
| $*$ | circular or linear convolution operator |
| $(\cdot)^T$ | transpose operation |
| $[\cdot]_{n,:}$ | row n of a matrix |
| $[\cdot]_{:,n}$ | column n of a matrix |
| N | number of samples per symbol (also DFT size for OFDM) |
| K | number of active subcarriers |
| $K_a = \{k_0, k_1, \ldots, k_{K-1}\}$ | set of active subcarriers |
| M | number of time slots |
| $D = \begin{bmatrix} d_{0,k_0} & d_{0,k_1} & \cdots & d_{0,k_{K-1}} \\ d_{1,k_0} & d_{1,k_1} & \cdots & d_{1,k_{K-1}} \\ \vdots & \vdots & \ddots & \vdots \\ d_{M-1,k_0} & d_{M-1,k_1} & \cdots & d_{M-1,k_{K-1}} \end{bmatrix}$ | QAm data symbols matrix of size M × K |
| d = vec(D) | data vector of size KM × 1 |
| $g_n$ | pulse shaping filter |
| $G = \begin{bmatrix} g_0 & g_{NM-1} & \cdots & g_1 \\ g_1 & g_0 & & g_2 \\ \vdots & \vdots & \ddots & \vdots \\ g_{NM-1} & g_{NM-2} & \cdots & g_0 \end{bmatrix}$ | filter matrix of size NM × NM |
| $S_N^M = \{s_{n,m}\}$, $s_{n,m} = \begin{cases} 1, & n = (m-1)N + 1 \\ 0, & \text{else} \end{cases}$ | up-sampled matrix of size NM × M |
| $W_{k,n} = \{e^{\frac{-j2\pi kn}{N}}\}, k \in K_a, n = 0, \ldots NM-1$ | modulation matrix of size, K × NM |
| $G' = G \times S_N^M$ | modified filtering matrix of size NM × M, i.e. the selected M columns of G |
| A with row $[A]_{n,:} = [W_{k,n}^H]_{n,:} \otimes [G']_{n,:}$ | system matrix of size NM × MK |
| x = Ad | transmitted signal (without CP) of length NM × 1 |
| $g_n[m, k] = (\delta[n - mN] * g_n)e^{j2\pi\frac{kn}{N}}$ | shifted version of $g_n$ in time and frequency |
| $a(\Delta m, \Delta k) = \sum_n g_n[m, k] g_n^*[m - \Delta m, k - \Delta k]$ | ambiguity function of $g_n$ |
| $L_{cp}$ | cyclic prefix length |
| $T_{OFDM}$ | OFDM symbol duration |
| $h_n$ | channel impulse response |
| $H_{m,k}$ | channel coefficient associated with subcarrier k and symbol m. |
| $w_n$ | zero-mean additive white Gaussian noise |
| $y_n = x_n * h_n + w_n$ | received signal |
| $y_n = \sum_k \sum_m H_{m,k} d_{m,k} g_n[m, k] + w_n$ | received signal model under assumption that channel is slowly fading both in time and frequency, and is constant over the GFDM sub-symbol duration and one subcarrier bandwidth. |
| $y = [y_0, y_1, \ldots, y_{NM}]^T$ | received vector of size NM × 1 |
| $w = [w_0, w_1, \ldots, w_{NM}]^T$ | noise vector of size NM × 1 |
| r | roll off factor of root raised cosine (RRC) pulse |

To model the GFDM channel from a transmitter to a receiver, the received signal is denoted by $y_n$ as:

$$y_n = x_n * h_n + w_n,$$

which corresponds to the transmitted signal $x_n$ sent through a multipath fading channel with impulse response $h_n$ and corrupted by zero-mean additive white Gaussian noise $w_n$. If the channel is slowly fading both in time and frequency, e.g., constant over one GFDM sub-symbol duration (equivalent to the OFDM symbol duration) and one subcarrier bandwidth, then the system can be modeled as:

$$y_n = \Sigma_k \Sigma_m H_{m,k} d_{m,k} g_n[m,k] + w_n,$$

where $H_{m,k}$ is the channel coefficient associated with subcarrier k and symbol m.

At the receiver side, assuming a channel impulse response $h_n = 1$ for an AWGN channel), the received signal vector can be expressed as:

$$y = x + w = Ad + w.$$

For a given received signal vector y, the data vector can be detected by a standard linear receiver given by:

$$\hat{d} = A_{rx} y,$$

where $A_{rx}$ denotes a receiver matrix. For a receiver with MF, ZF, and minimum mean square error (MMSE), the matrix $A_{rx}$ is given as follows:

MF: $A_{rx} = A^H$
ZF: $A_{rx} = (A^H A)^{-1} A^H$
MMSE:

$$A_{rx} = \left(\frac{\sigma_w^2}{\sigma_d^2} I + A^H A\right)^{-1} A^H,$$

where $\sigma_w^2$ and $\sigma_d^2$ are noise and data symbol variances, respectively, and I is an identity matrix.

Since the interference in GFDM is caused by pulse shaping filter and is known at the transmitter, it is possible to pre-cancel such interference by considering pre-coded data $d' = (A^H A)^{-1} d$ at the transmitter. Hence, the transmitted signal is given by:

$$x = Ad'.$$

For an ideal channel, e.g., y=x, and using a simple MF receiver, the data vector can be recovered as follows:

$$\hat{d} = A_{rx} y = A^H A (A^H A)^{-1} d = d.$$

With channel knowledge and using cyclic prefix (CP), a DFT/IDFT-based channel equalization can be performed by, as:

$$u_n = IDFT\left(\frac{DFT(y_n)}{DFT(h_n)}\right).$$

However, this requires that the channels are time-invariant for the block-based DFT/IDFT channel equalization. This assumption may not always be satisfied, especially over a GFDM symbol (which is M times longer than a OFDM symbol). In this case, the demodulation/filtering process is done on the equalized signal $u_n$, based on standard receiver models (e.g., MF, ZF and MMSE). In an embodiment, an improved receiver model is used, where the demodulation/filtering (e.g., MF, ZF, and MMSE) is implemented to recover the time-frequency grid point, before channel equalization is implemented, e.g., using the equation:

$$z_{m,k} = \sum_n y_n g_n^*[m, k],$$

$$\hat{d}_{m,k} = \frac{z_{m,k}}{H_{m,k}},$$

where $z_{m,k}$ is a demodulated/filtered signal which is not yet equalized, and $\hat{d}_{m,k}$ is a result of one-tap equalization done by dividing $z_{m,k}$ by $H_{m,k}$.

This type of processing can be used if the channel is assumed slowly fading both in time and frequency such that the system can be modeled by $y_n = \Sigma_k \Sigma_m H_{m,k} d_{m,k} g_n[m, k] + w_n$. These assumptions can be satisfied based on the fact that the subcarrier spacing and sub-symbol duration used in GFDM can be selected to be the same as those of a OFDM system. As such, the assumption on time-invariant channel over the whole GFDM symbol is not required for the channel equalization. Moreover, it is possible to reduce latency (required in block processing in DFT/IDFT equalization) when filtering is used.

Since there is interference inherent in GFDM (due to pulse shaping), pilot-based channel estimation is configured to pre-cancel such interference at the transmitter, so that clean pilots are observed at the receiver and used for channel estimation. Two embodiment channel estimation methods are used for GFDM. In a first embodiment method, also referred to as Pilot-IC, interference is pre-cancelled at only pilot symbols. With Pilot-IC for GFDM, complex-valued pilot symbols, each consisting of an intended pilot and an interference cancellation term, is used for channel estimation. In a second embodiment method, also referred to as Tx-IC, interference is simultaneously pre-cancelled at all symbols (both at data and pilot symbols). Hence, only known pilot symbols are used for channel estimation at the receiver. The Tx-IC for GFDM allows a low-complexity MF receiver to be used for demodulation/filtering at the receiver. Using scattered pilots over time-frequency grid points allows estimating channels that are both frequency selective and time varying. The estimate channels can then be used for simple single-tap channel equalization at time-frequency grid data points.

In order to pre-cancel the interference at the transmitter for Pilot-IC scheme, the interference at pilot symbols need to be calculated. With a matched filter receiver, the interference, e.g., ISI and Inter Carrier Interference (ICI), can be calculated from an ambiguity function, defined as follows:

$$a(\Delta m, \Delta k) = \Sigma_n g_n[m,k] g^*_n[m-\Delta m, k-\Delta k].$$

For integer nonzero value of $\Delta m$ and $\Delta k$, $a(\Delta m, \Delta k)$ provides the information on ISI caused by data from $\Delta m$ symbols away, and information on ICI caused by data from $\Delta k$ subcarriers away. The value $a(\Delta m, \Delta k)$ is symmetric around $\Delta m=0$ and $\Delta k=0$.

Figure 2:
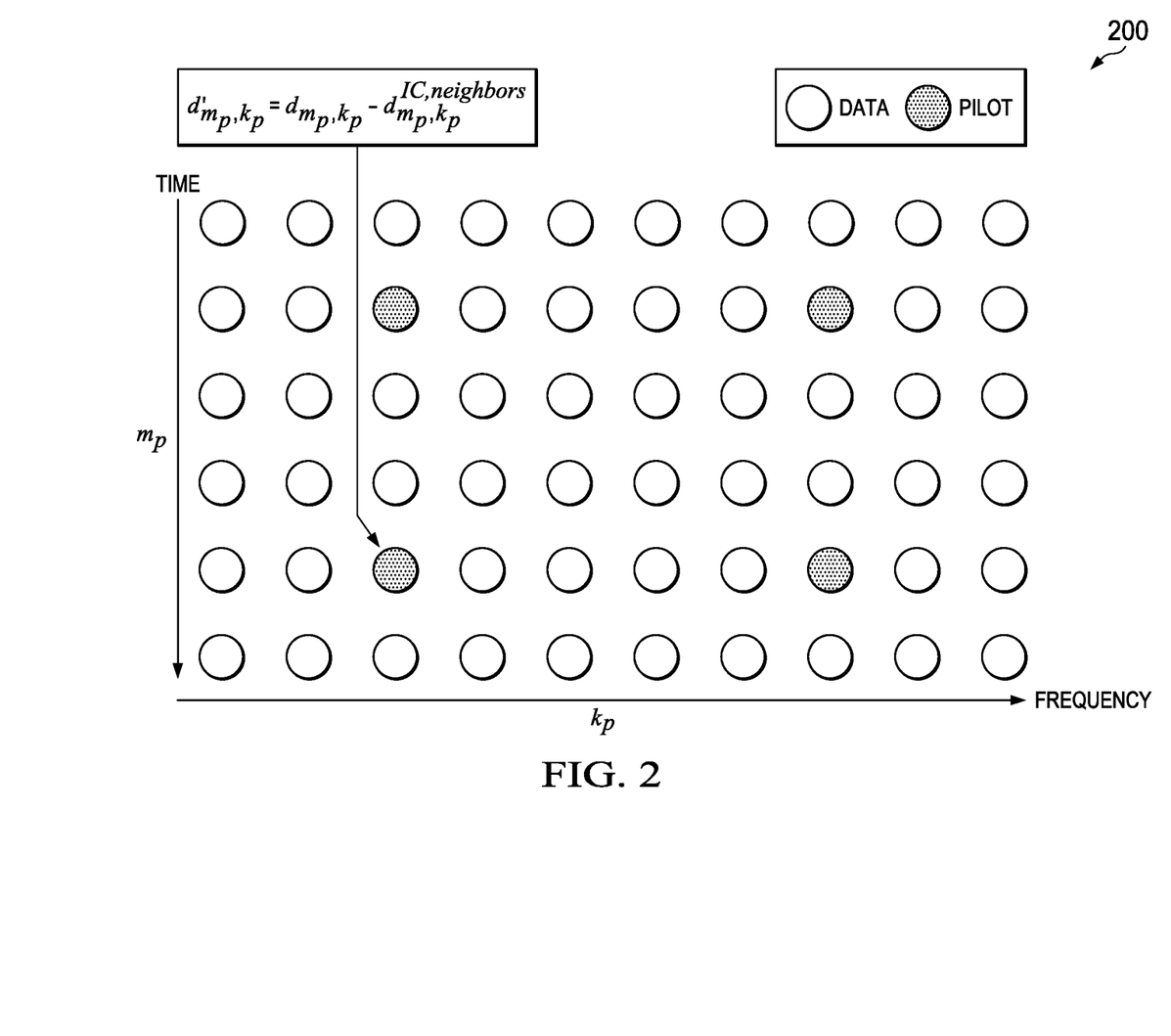
FIG. 2 illustrates scattered pilot and data symbols in time-frequency grid.

With the Pilot-IC channel estimation technique, the interference is pre-cancelled at only pilot symbols at the transmitter. FIG. 2 shows the scattered pilots in time-frequency grid of data for a GFDM symbol, and illustrates that the pilot symbol at subcarrier $k_p$ and symbol $m_p$ is given by:

$$d'_{m_p,k_p} = d_{m_p,k_p} - d_{m_p,k_p}^{IC,neighbors},$$

where $d_{m_p,k_p}$ is an intended pilot data, and $d_{m_p,k_p}^{IC,neighbors}$ denotes the interference term caused by neighbor symbols given by:

$$d_{m_p,k_p}^{IC,neighbors} = \Sigma_{(m,k)_{neighbors} \neq (m_p,k_p)} d_{m,k} a(m-m_p, k-k_p).$$

At the receiver, by matched filtering $y_n$ with $g_n^*[m_p, k_p]$ associated with the pilot symbols, the following relation is obtained:

$$\sum_n y_n g_n^*[m_p, k_p] = z_{m_p, k_p}$$

$$= H_{m_p,k_p} d'_{m_p,k_p} +$$

$$\sum_{(m,k)_{neighbors} \neq (m_p,k_p)} H_{m,k} d_{m,k} a(m-m_p, k-k_p) + I$$

$$= H_{m_p,k_p}\left(d_{m_p,k_p} - d_{m_p,k_p}^{IC,neighbors}\right) +$$

$$\sum_{(m,k)_{neighbors} \neq (m_p,k_p)} H_{m,k} d_{m,k} a(m-m_p, k-k_p) + I$$

$$\cong H_{m_p,k_p} d_{m_p,k_p},$$

which equals to a product of channel coefficient $H_{m_p,k_p}$ and pilot symbol $d_{m_p,k_p}$, under an assumption that the channel is constant in the neighborhood of the pilot (for substantially complete interference cancellation). Therefore, the channel coefficient at pilot symbol can be estimated by:

$$\hat{H}_{m_p,k_p} = \frac{z_{m_p,k_p}}{d_{m_p,k_p}}.$$

In the Tx-IC-based channel estimation technique, the interference is simultaneously pre-cancelled at all symbols, by considering the pre-coded data vector $d' = (A^H A)^{-1} d$ at the transmitter. The transmitted signal is given by:

$$x = Ad'.$$

At the receiver, a matched filter output associated with the pilot symbol is given by $z_{m_p,k_p} = \Sigma_n y_n g_n^*[m_p, k_p]$, or the matrix model can be used as:

$$z = A^H y = vec\{z_{m,k}\}.$$

Figure 3:
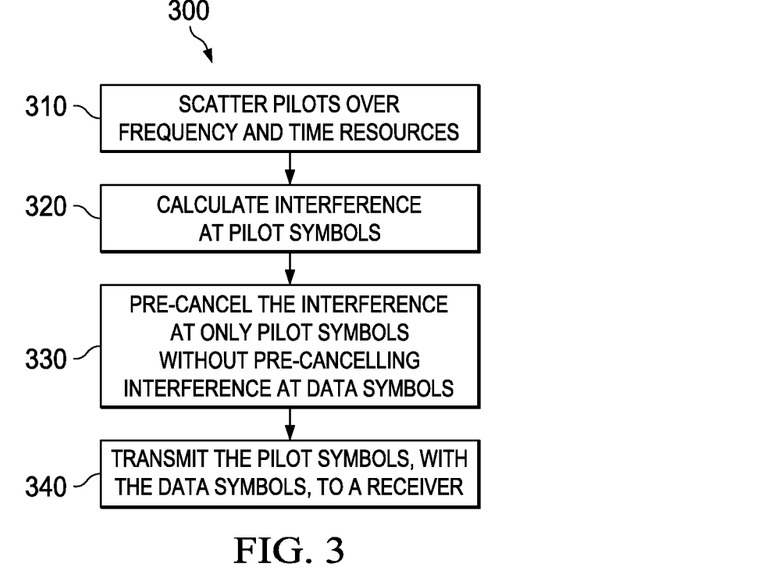
FIG. 3 is a process flow of an embodiment method for Pilot-Interference Cancellation (Pilot-IC) for channel estimation of a GFDM signal at a transmitter.
Figure 4:
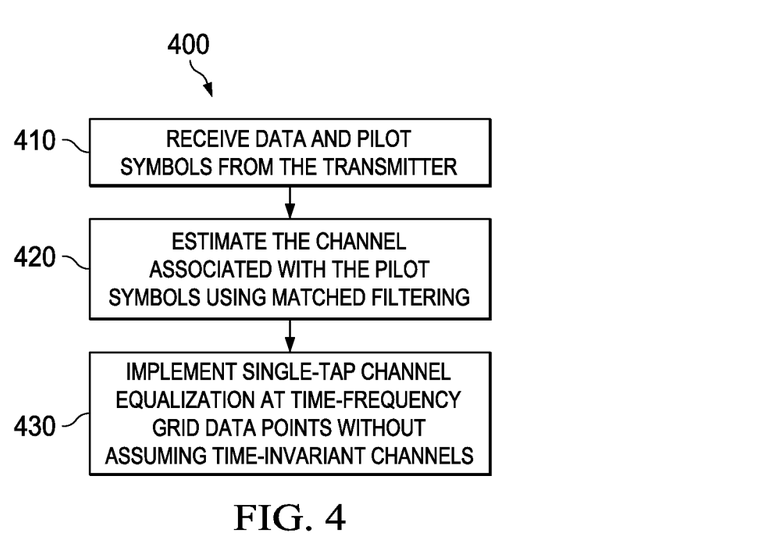
FIG. 4 is a process flow of an embodiment method for Pilot-IC for channel estimation of a GFDM signal at a receiver.

Thus, the channel associated with the pilot symbols can be estimated by $\hat{H}_{m_p,k_p} = z_{m_p,k_p} / d_{m_p,k_p}$. After obtaining the channel estimates at pilot symbols, FIG. 3 shows an embodiment method 300 for Pilot-IC for channel estimation of a GFDM signal at a transmitter. At step 310, pilots are scattered over frequency and time resources. The pilot symbols are scattered across the frequency and time resources by reducing or avoiding neighboring or adjacent pilot symbols in frequency and time grid points representing frequency and time allocations for transmission, in other words by spreading the pilot symbols across the frequency and time grid points. At step 320, interference at pilot symbols is calculated. At step 330, the interference is pre-cancelled at only pilot symbols (without pre-cancelling interference for the data symbols). At step 340, the pilot symbols are transmitted (e.g., from a user device), with the data symbols, to a receiver (at a base station or a network). The transmitted pilot symbols are complex-valued pilot symbols, each comprising an intended pilot and an interference cancellation term. FIG. 4 shows an embodiment method 400 for the Pilot-IC channel estimation at the receiver side corresponding to the method 300 of the transmitter. At step 410, data and pilot symbols are received from the transmitter. The data and pilot symbols may experience time-variant channels, frequency selective channels, or both time-variant and frequency selective channels. At step 420, the channel associated with the pilot symbols is estimated using matched filtering. At step 430, the receiver implements single-tap channel equalization at time-frequency grid data points where no assumption of time-invariant channels is made.

Figure 5:
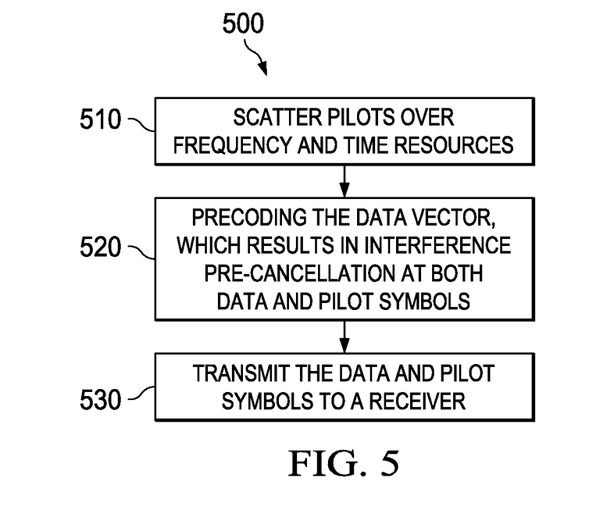
FIG. 5 is a process flow of an embodiment method for Transmitter IC (Tx-IC) for channel estimation of a GFDM signal at a transmitter.
Figure 6:
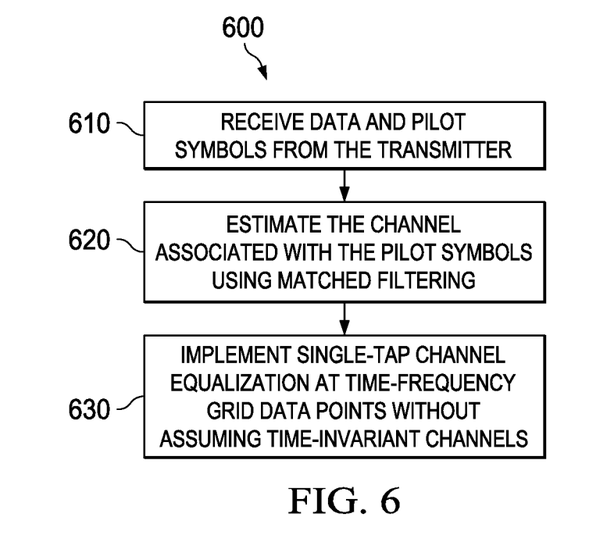
FIG. 6 is a process flow of an embodiment method for TX-IC for channel estimation of a GFDM signal at a receiver.

The use of Pilot-IC for uplink because with Pilot-IC, the transmitter has less complexity as only interference is cancelled at only pilot symbols, and the burden of interference cancellation on data symbols can be pushed to the base station FIG. 5 shows an embodiment method 500 for Tx-IC for channel estimation of a GFDM signal at a transmitter. At step 510, pilots are scattered over frequency and time resources. The pilot symbols are scattered across the frequency and time resources by reducing or avoiding neighboring pilot symbols in frequency and time grid points representing frequency and time allocations for transmission. Step 520 includes precoding the data vector, $d'=(A^H A)^{-1} d$, which results in interference pre-cancellation at both data and pilot symbols. At step 530, the data and pilot symbols are transmitted (e.g., from a user device) to a receiver (e.g., at a base station or a network). FIG. 6 shows an embodiment method 600 for the Tx-IC channel estimation at the receiver side corresponding to the method 600 of the transmitter. At step 610, data and pilot symbols are received from the transmitter. The data and pilot symbols may experience time-variant channels, frequency selective channels, or both time-variant and frequency selective channels. At step 620, the channel associated with the pilot symbols is estimated using matched filtering. At step 630, the receiver implements single-tap channel equalization at time-frequency grid data points where no assumption of time-invariant channels is made.

Figure 7:
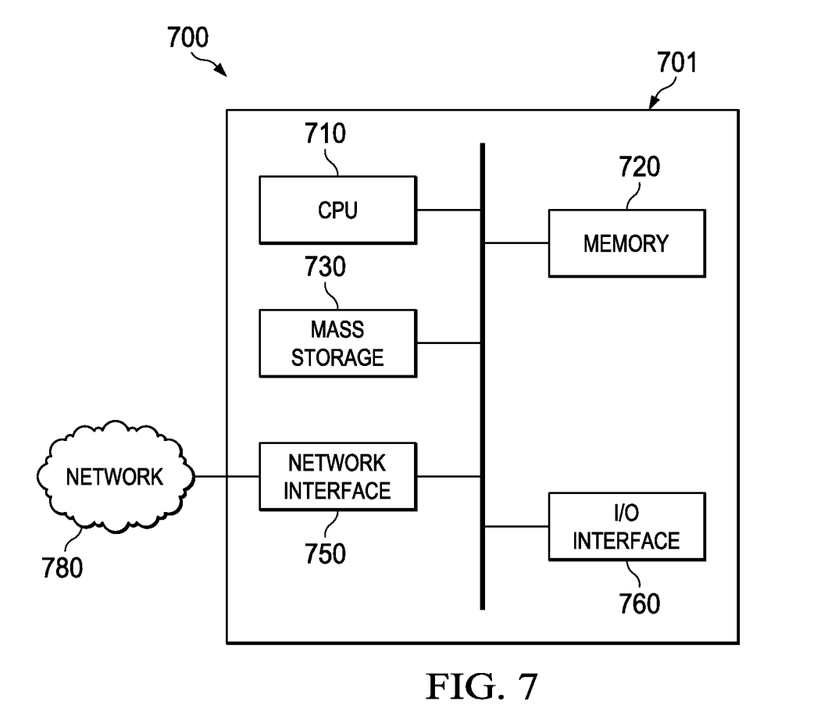
FIG. 7 is a diagram of a processing system that can be used to implement various embodiments.

FIG. 7 is a block diagram of an exemplary processing system 700 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as network interfaces, storage interfaces, and the like. The processing unit 701 may include a central processing unit (CPU) 710, a memory 720, a mass storage device 730, and an I/O interface 760 connected to a bus. The bus may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The mass storage device 730 may comprise any type of storage device configured to store data, programs, and other information and to make the data, programs, and other information accessible via the bus. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a transmitter component for enabling channel estimation for Generalized Frequency Division Multiplexing (GFDM) signals in a network, the method comprising:
generating, by a transmitter, GFDM signals including a plurality of pilot symbols and a plurality of data symbols, wherein the GFDM signals are generated using spectral-contained pulse shaping such that the GFDM signals include non-orthogonal subcarriers;
allocating the pilot symbols over both frequency and time resources for a plurality of channels;
generating interference cancelled pilot symbols by pre-cancelling, from the pilot symbols of the GFDM signals generated by the transmitter, interference resulting from the data symbols of the GFDM signals generated by the transmitter to mitigate the interference observed by a receiver; and transmitting, by the transmitter, the interference cancelled pilot symbols and the data symbols in the GFDM signals over the frequency and time resources, the interference cancelled pilot symbols and the data symbols of the GFDM signal being transmitted to the receiver.

2. The method of claim 1, wherein generating the interference cancelled pilot symbols comprises pre-cancelling the interference from the pilot symbols without pre-cancelling interference from the data symbols.

3. The method of claim 1, wherein generating the interference cancelled pilot symbols comprises precoding a data vector resulting in the interference pre-cancellation at the pilot symbols.

4. The method of claim 1, wherein the transmitted interference canceled pilot symbols are complex-valued symbols each comprising an intended pilot symbol and an interference cancellation term.

5. The method of claim 1 further comprising scattering the pilot symbols across the frequency and time resources by reducing or avoiding adjacent pilot symbols allocated at the time and frequency resources.

6. The method of claim 1 further comprising:
pre-cancelling, from the data symbols of the GFDM signals generated by the transmitter, interference resulting from the pilot symbols of the GFDM signals generated by the transmitter before transmitting the interference cancelled pilot symbols and the data symbols in the GFDM signals.

7. The method of claim 1, wherein the GFDM signals are transmitted over time-variant channels or frequency selective channels.

8. The method of claim 1, wherein the GFDM signals are transmitted over both time-variant and frequency selective channels.

9. A transmitter component configured to enable channel estimation for Generalized Frequency Division Multiplexing (GFDM) signals in a network, the transmitter component comprising:
at least one processor; and
a non-transitory computer readable storage medium storing programming for execution by the at least one processor, the programming including instructions to:
generate GFDM signals including a plurality of pilot symbols and a plurality of data symbols, wherein the GFDM signals are generated using spectral-contained pulse shaping such that the GFDM signals include non-orthogonal subcarriers;
allocate the pilot symbols over both frequency and time resources;
generate interference cancelled pilot symbols by pre-cancelling, from the pilot symbols of the GFDM signals generated by the transmitter, interference resulting from the data symbols of the GFDM signals generated by the transmitter to mitigate the interference observed by a receiver; and
transmit, in the GFDM signals, the interference cancelled pilot symbols and the data symbols over the frequency and time resources, the interference cancelled pilot symbols and the data symbols of the GFDM signal being transmitted to the receiver.

10. The transmitter component of claim 9, wherein the instructions to generate the interference cancelled pilot symbols include instructions to pre-cancel the interference from the pilot symbols without pre-cancelling interference from the data symbols.

11. The transmitter component of claim 9, wherein the instructions to generate the interference cancelled pilot symbols includes instructions to precode a data vector resulting in the interference pre-cancellation at the pilot symbols.

12. The transmitter component of claim 9, wherein the transmitter component is a component of a base station configured to transmit on a downlink to a device.

13. The transmitter component of claim 9, wherein the transmitter component is a component of a device configured to transmit on an uplink to the network.

14. The transmitter component of claim 9, wherein the interference is inherent interference in the GFDM signals.

15. The transmitter component of claim 9, wherein the programming includes further instructions to:
pre-cancel, from the data symbols of the GFDM signals generated by the transmitter, interference resulting from the pilot symbols of the GFDM signals generated by the transmitter before transmitting the interference cancelled pilot symbols and the data symbols in the GFDM signals.

16. The transmitter component of claim 9, wherein the GFDM signals are transmitted over time-variant channels or frequency selective channels.

17. The transmitter component of claim 9, wherein the GFDM signals are transmitted over both time-variant and frequency selective channels.

* * * * *